Patented Jan. 31, 1950

2,496,222

UNITED STATES PATENT OFFICE 2,496,222

CONTINUOUS PROCESS FOR EMULSION POLYMERIZATION OF UNSATURATED COMPOUNDS

Egbert Cornelis Hendrik Kolvoort and Gerrit Akkerman, Amsterdam, Netherlands, assignors to Shell Development Company, San Francisco, Calif., a corporation of Delaware No Drawing. Application June 17, 1947,
Serial No. 755,242

6 Claims. (Cl. 260—91.7)

This invention relates to an improved process for effecting emulsion polymerization of polymerizable compounds in a continuous manner. More particularly, the invention provides a process wherein emulsion polymerization of vinyl chloride in an elongated reactor devoid of stirrers has been made practicable and efficient.

Addition polymerization of unsaturated compounds in aqueous emulsion has been recognized for some years as a particularly advantageous method for manufacture of high molecular weight polymers. In both commercial and experimental practice of the method, it has been customary either to charge ingredients to a reactor in which formation of the emulsion and polymerization of the unsaturated compound is effected, or to preform the emulsion in a separate operation after which it is charged to a reactor and polymerized. Both of these methods have entailed batchwise operation wherein the emulsion is formed in or charged to the reactor, then polymerization is allowed to progress in the charged reactor, and finally the formed polymer is withdrawn from the reactor. Such batchwise operation is most undesirable for commercial production of resinous polymer owing to the large labor cost required for the periodical charging and discharging of the reactor as well as the fact that the equipment is idle during these periods.

The slowness of the polymerization reaction even in aqueous emulsion where it requires a number of hours to approach completion has precluded adoption of the usual batchwise reactor to continuous operation. Upon continuously feeding in emulsion to the conventional reactor and withdrawing the contents therefrom continuously, there is considerable "short-circuiting" of the reaction emulsion—i. e., newly entered emulsion is drawn out of the reactor before it has opportunity for the polymerizable compound therein to polymerize. It has been suggested that emulsion polymerization be effected continuously by continuously feeding the emulsion into one end of a tubular reactor wherein polymerization occurs during passage therethrough and continuously withdrawing emulsified polymer from the other end. However, this seemingly attractive continuous method has never been used on commercial scale for several reasons. There is no practical way for mechanically agitating the passing contents in the tubular reactor as is done with stirrers in the customary batchwise reactor. Most emulsions of monomeric polymerizable compounds are not sufficiently stable to remain in emulsified state without considerable extraneous mechanical agitation. In addition, we found another serious fault with use of a tubular reactor. It was known that emulsion polymerization reactions of vinyl chloride, vinylidene chloride and other polymerizable substances is fastest when the water phase of the emulsion is acidic and this is especially true when hydrogen peroxide is employed as polymerization catalyst. In order to keep the length of the tubular reactor to a reasonable minimum, it was, of course, desirable to make use of the fastest polymerizing conditions possible. However, we found that upon preparing the acidic aqueous emulsion in the usual manner and pumping it through a tubular reactor, a fault appeared which prevents commercial use of the method. We found that polymer deposited upon the walls of the reactor at such a fast rate that the tube soon became plugged. Removal of deposited polymer from a tubular reactor of a length required for emulsion polymerization is extremely difficult owing to the uncertainty of knowing where the plug has built up. In addition, deposited polymer on the walls of the reactor in even lesser amounts than give plugging are undesirable because heat transfer is adversely affected with the result that the polymer produced lacks suitable properties which are dependent upon the temperature of polymerization.

Quite unexpectedly, we have now discovered a means of overcoming the above-mentioned shortcomings which have heretofore precluded use of continuous emulsion polymerization in elongated reactors. According to our invention, we have now found it to be particularly advantageous that in the continuous execution of emulsion polymerization in which the aqueous emulsion of the polymerizable substance is passed through an elongated reaction space, not to add the acid to the mixture of emulsifying agent, polymerizable compound and water which is then reduced to the emulsified state for introduction into the reactor, but rather to emulsify the monomer to be polymerized in a non-acidic aqueous medium and to add the acid to the emulsion just prior to its introduction into the elongated reaction space. In the method of the invention, the emulsion is brought to its desired pH for fast reaction by adding acid immediately before the emulsion is introduced into the polymerization reactor.

As compared with the hitherto generally applied process, in which the acid is added before emulsification of monomer, the present process has the great advantage of the monomer emulsion being very finely dispersed and having so high a stability as to enable the polymerization to be carried out in simple apparatus without stirring mechanism, or other moving parts, which lead to difficulties of sealing and are costly. The emulsions obtained by adding acid to the mixture before emulsification give emulsions which have the monomer in a less finely dispersed state and also the emulsion is appreciably less stable. Consequently, it is necessary to effect mechanical stirring in the reaction space to prevent monomer being separated from the emulsion during polymerization. This fact prevents use of an elongated reaction vessel such as the tube reactor which is otherwise so attractive. The method of the present invention, on the other hand, enables the tubular reactor to be used in a practicable continuous manner for emulsion polymerization.

For the purpose of illustrating the process of our invention and comparing its performance with an adaptation to continuous operation of the usual method of preforming emulsion of monomer, the following detailed examples are given:

Example I

The polymerization equipment consisted of a set of acid-proof steel tubes joined end to end so as to have a total length of about 120 meters. The internal diameter of the tube was 2.5 cm. so that the reactor had a capacity of about 60 liters. Temperature control for the polymerizing emulsion was maintained at about 35° C. by external circulation of cooling water.

A very finely divided, stable emulsion of vinyl chloride was separately prepared by mixing 7.1 parts by weight of an aqueous solution containing about 2% of sodium cetyl sulfate in a closed mixing vessel with 2.9 parts by weight of pure vinyl chloride and passing the resulting mixture through a turbomixer in which the emulsion is formed.

This emulsion was continuously supplied to one end of the tubular reactor at the rate of about 10 kg. per hour, and emulsified polymer was continuously withdrawn from the other end through a pressure release valve adjusted so as to maintain the monomeric vinyl chloride in liquid state in the emulsion. Subsequent to the emulsifying equipment and just prior to entrance of the line feeding monomeric emulsion into the tubular reactor, a solution of 4% hydrogen peroxide and hydrochloric acid was continuously added to the entering emulsion at the rate of 0.2 kg. per hour. This gave the emulsion undergoing polymerization in the reactor a pH of 2.5. The polymerization of the vinyl chloride proceeded smoothly and regularly at an average polymerization rate of about 25 to 30 g. of polyvinyl chloride per liter of emulsion per hour for 250 hours of uninterrupted operation after which the unit was voluntarily shut down.

Example II

When the same tubular reactor was used under the same reaction conditions, except that the acidified hydrogen peroxide solution was added before emulsification of the vinyl chloride, the polymerization had to be discontinued after only 40 hours of continuous operation owing to clogging of the reaction tube by deposit of polymer on the walls thereof.

The method of the invention is suitable for continuous production of polymer in aqueous emulsion from a variety of neutral substantially water-insoluble polymerizable compounds among which are, for example, such compounds as vinyl chloride, vinyl bromide, vinylidene chloride, vinylidene bromide, vinylidene chlorobromide, vinyl acetate, vinyl propionate, styrene, methyl styrene, chlorostyrene, methyl acrylate, ethyl acrylate, butyl acrylate, methyl methacrylate, acrylonitrile, methacrylonitrile, ethyl fumarate, and the like, the compounds being neutral in the sense of not being either acidic or basic. Preferably the only carbon-to-carbon unsaturation contained in the polymerizable compound is a single

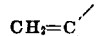

group. The method is particularly preferred for use in polymerizing vinyl chloride or vinylidene chloride. While the use of a single monomer produces a homopolymer of the compound, mixtures of two or more different compounds may be used, if desired, to obtain copolymers or interpolymers.

The preformed emulsion for admittance into the elongated reaction space may be prepared by emulsifying the polymerizable compound in water in any suitable manner such as by the use of a colloid mill or by application of turbomixers or other mixing equipment. The emulsion is made up with about 2 to 5 parts of water per part of polymerizable compound. An emulsifying agent is used in order to form a stable emulsion of the polymerizable compound. Any agent effective in acid solution is suitable for this purpose such as alkali metal salts, like sodium or potassium salts, of hydrocarbon sulfates or sulfonates wherein the hydrocarbon radical contains 10 to 20 carbon atoms. Among particular emulsifying agents are sodium lauryl sulfate, sodium cetyl sulfate, isopropyl naphthalene sodium sulfonate, or the sodium salts of sulfonated Turkey red oil. In general, about 1% to 5% of emulsifying agent based on the aqueous phase of the emulsion is used. In the process of the invention smaller quantities of emulsifier generally suffice than in the case where acidification of the water is effected prior to the emulsification. An additional advantage consists in that the polymerization may be carried out with higher monomer concentrations without risks of the deposits formed, which is important and, in fact, vital where the sodium salts of sulfonated Turkey red oil. In many cases as little as one part of water per part of polymerizable compound may be used.

In order that the emulsion of polymerizable compound will polymerize, a suitable polymerization catayist is necessarily present in the emulsion. Hydrogen peroxide is the preferred polymerization catalyst although other water-soluble peroxy compounds may be used if desired, such as ammonium or alkali metal salts of persulfuric or perboric acid. The amount of polymerization cataylst employed will vary with the particular compound undergoing polymerization in the emulsion as well as with other conditions of the polymerization such as the temperature. In general, there is used from about 0.01% to 4% of peroxy compound based on the amount of polymerizable compound contained in the emulsion. The catalyst may be added to the substance to be polymerized before, during or after the emulsification. Preferably, the addition is effected simultaneously with the addition of the acid just prior to entrance of the emulsion into the reactor.

The acid which is added just prior to entrance of the non-acidic emulsion into the reactor is any completely water-miscible acid of sufficient strength to give the emulsion a pH of about 1.5 to 4. Preferably sufficient acid is added so that the emulsion undergoing polymerization has a pH from about 2 to 3. For this purpose acetic acid or sulfuric acid may be used although it is preferred to effect the acidification with hydrochloric nitric acid. Other carboxylic acids having a dissociation constant of at least $10^{-3}$ may be also used. The acid added is, of course, a separate compound from the peroxy polymerization catalyst.

In the continuous process of the invention wherein the non-acidic emulsion of monomer is preformed before being subjected to polymerizing conditions, it is advantageous to add the acid at a point subsequent to the mixing or emulsifying equipment. The preferred point is in the line continuously carrying emulsion from the emulsifier to the elongated reactor. If desired, however, the acid may be added to the preformed emulsion in the emulsifier provided the resulting acidified emulsion is fed in short time to the reactor. Prior to the present invention, it had been suggested to prepare initially the aqueous emulsion and then acidify by addition of acid after which the acidified emulsion is polymerized batchwise in a reactor fitted with a stirrer. In view of the fact that such batchwise reactors have always been fitted with stirrers which keep the contents in a state of vigorous agitation, no difference was apparent to prior workers in the art between use of emulsion prepared by adding the acid prior to emulsification and adding it subsequent to the emulsification. The stirrer kept the contents of the reactor in a state of vigorous agitation so that deposit of polymer did not occur or was very unlikely. Furthermore, the space in the batch reactors is not so restricted that deposits of relatively small amounts of polymer on the walls thereof would preclude operation as is the case in the elongated reaction vessel employed in a continuous method. It therefore could not be inferred from this prior batch method that in the continuous process using an elongated reaction vessel, the difference between practicable operation and failure would depend upon the order and time of addition of the acid to ingredients contained in the reaction mixture. It could not be foreseen to be of such special advantage not to add the acid required for adjustment to the desired pH value until after emulsification of the substance to be polymerized.

The elongated reaction space in which the emulsification is effected is particularly advantageous because of the fact that it is devoid of stirring mechanisms with all their attendant drawbacks such as seals and power consumption. The most important feature of the invention is, however, the fact that a tubular reactor may be used without danger of deposits of polymer therein. Such deposits of polymer, besides plugging the tubular reactor in comparatively short time, also seriously disturb the complex emulsification reaction system when they precipitate in the elongated reaction space. Polymerization of the emulsion is preferably effected in a reactor of cylindrical structure although other shapes such as square tubes may be used if desired. Since the reaction is comparatively slow, a reaction space of considerable length is required and consequently there may be used helically shaped reaction tubes or a sinuous series of tubes joined by U-shaped bends in order that the reaction system may be confined to a reasonable space. In general, the elongated reaction space is about 3,000 to 7,000 times the square root of the average area thereof or if a cylindrical reactor is employed, about 2,650 to 6,200 times the average diameter of the tubular reactor. In order to control the temperature of polymerization which is from about 25° C. to 75° C., or most preferably about 30° C. to 45° C., the reaction tubes are immersed in a suitable bath such as of water. The external water bath is used either to heat the emulsion to initiate reaction or to cool it in order to extract the exothermic heat of reaction. By circulating the external water over the tubes at suitable temperature in known manner, any desired reaction temperature may be maintained in the polymerizing emulsion. In some cases it may be desirable to regulate the temperature of the emulsion in one part of the elongated reaction space at a different temperature than in another part. This is readily accomplished by use of two or more external fluid baths for the reaction space.

In executing the process of the invention the emulsion is first formed as explained above and then pumped into one end of the elongated reaction space. The acid is added just prior to entrance of the emulsion into the reactor. The rate of pumping of the emulsion through the elongated reaction space is regulated so that there is sufficient residence time thereof as to effect appreciable formation of polymer. Ordinarily the residence time is regulated so that at least 40% of the polymerizable compound is converted to polymer, although preferably a conversion of at least 70% thereof is effected. The rate of pumping the emulsion through the elongated reaction space is dependent upon many factors and is best determined for any particular case by simple experiment wherein a reasonable rate is chosen and emulsified polymer is withdrawn at the other end. This emulsified polymer is analyzed in usual manner so as to determine the proportion of polymer and unpolymerized monomer therein. Then, if necessary, the rate is adjusted so as to obtain a desired conversion to polymer.

The emulsified polymer is discharged from the exit end of the elongated reaction space through a suitable pressure regulating valve which maintains the polymerizable compound in the emulsion in liquid phase under the reaction conditions. The discharged emulsified polymer is preferably fed to a flashing vessel wherein any unpolymerized monomer is removed therefrom for reuse in the process and the emulsion is coagulated in usual manner by use of freezing or addition of salts like sodium chloride or aluminum sulfate or addition of alcohol in order to recover the polymer therefrom.

We claim as our invention:

1. A process for producing polymer from a neutral, substantially water-insoluble polymerizable compound whose only carbon-to-carbon unsaturation is a single

group which comprises forming a non-acidic emulsion of the vinylidene compound in water containing as emulsifying agent a compound from the group consisting of alkali metal salts of hydrocarbon sulfates and sulfonates wherein the hydrocarbon radical contains 10 to 20 carbon atoms, continuously introducing the emulsion into one end of an elongated reaction space, adding to the emulsion just prior to its introduction into the reaction space a peroxy polymerization catalyst and sufficient completely water-miscible acid to give the emulsion a pH of 1.5 to 4, flowing the acidified emulsion through the reaction space under polymerizing conditions at such a rate that at least 40% of the polymerizable compound is polymerized while passing therethrough, and continuously withdrawing emulsified polymer from the other end of the reaction space.

2. In a process wherein a non-acidic emulsion in water containing as emulsifying agent a compound from the group consisting of alkali metal salts of hydrocarbon sulfates and sulfonates wherein the hydrocarbon radical contains 10 to 20 carbon atoms of a neutral, substantially water-insoluble polymerizable compound whose only carbon-to-carbon unsaturation is a single

group is prepared separately, and the emulsion is introduced continuously into one end of an elongated reaction space through which the emulsion flows at a pH of 1.5 to 4 under polymerizing conditions at such a rate that at least 40% of the compound is converted to polymer during the passage therethrough, the step of continuously adding completely water-miscible inorganic acid to the emulsion being introduced into the reaction space, said addition being made just prior to the introduction and in amount sufficient to give the emulsion a pH of 1.5 to 4.

3. In a process wherein vinyl chloride is mixed with water containing as emulsifying agent a compound from the group consisting of alkali metal salts of hydrocarbon sulfates and sulfonates wherein the hydrocarbon radical contains 10 to 20 carbon atoms to form a non-acidic emulsion and the emulsion is introduced continuously into one end of an elongated reaction space through which the vinyl chloride passes as an aqueous emulsion under polymerizing conditions at such a rate that at least 40% is converted to polymer, the step which comprises adding immediately prior to introduction of the emulsion into the reaction space hydrogen peroxide and a completely water-miscible mineral acid in amount sufficient to give the emulsion continuously passing through the reaction space a pH of 2 to 3.

4. A process for producing polymer from vinylidene chloride which comprises forming a non-acidic emulsion of vinylidene chloride in water containing as emulsifying agent a compound from the group consisting of alkali metal salts of hydrocarbon sulfates and sulfonates wherein the hydrocarbon radical contains 10 to 20 carbon atoms, continuously introducing the emulsion into one end of an elongated reaction space, adding to the emulsion just prior to its introduction into the reaction space a peroxy polymerization catalyst and sufficient completely water-miscible mineral acid to give the emulsion a pH of 1.5 to 4, continuously flowing the acidified emulsion through the reaction space under polymerizing conditions at a rate such that at least 40% of the vinylidene chloride is converted to polymer during the passage therethrough, and continuously withdrawing the resulting emulsified polymer from the other end of the reaction space.

5. A process for producing polymer from vinyl chloride which comprises forming a non-acidic emulsion of vinyl chloride in water containing as emulsifying agent a compound from the group consisting of alkali metal salts of hydrocarbon sulfates and sulfonates wherein the hydrocarbon radical contains 10 to 20 carbon atoms, continuously introducing the emulsion into one end of an elongated reaction space, adding to the emulsion just prior to its introduction into the reaction space a peroxy polymerization catalyst and sufficient completely water-miscible mineral acid to give the emulsion a pH of 1.5 to 4, continuously flowing the acidified emulsion through the reaction space under polymerizing conditions at a rate such that at least 40% of the vinyl chloride is converted to polymer during the passage therethrough, and continuously withdrawing the resulting emulsified polymer from the other end of the reaction space.

6. A process for the preparation of polyvinyl chloride which comprises emulsifying vinyl chloride into a substantially neutral emulsion with water in the presence of a sodium alkyl sulfate of 10 to 20 carbon atoms, continuously introducing the emulsion into one end of an elongated cylindrical reaction space having the length in the direction of flow of the emulsion therethrough from 2650 to 6200 times the average diameter thereof, adding to the emulsion just prior to its introduction into the reaction space about 0.01% to 2% of hydrogen peroxide and sufficient hydrochloric acid to give the emulsion a pH of 2 to 3 during its passage through the reaction space, continuously flowing the acidified emulsion through the reaction space at a temperature between about 35° C. and 60° C. and at a rate so that at least 40% of the vinyl chloride is converted to polyvinyl chloride, and continuously withdrawing the resulting emulsified polymer from the other end of the reaction space.

EGBERT CORNELIS
HENDRIK KOLVOORT.
GERRIT AKKERMAN.

REFERENCES CITED

The following references are of record in the file of this patent:

UNITED STATES PATENTS

| Number | Name | Date |
| --- | --- | --- |
| 2,333,634 | Britton et al. | Nov. 9, 1943 |
| 2,395,327 | Hanford | Feb. 19, 1946 |
| 2,404,779 | Arnold | July 30, 1946 |